(12) United States Patent
Motwani et al.

(10) Patent No.: US 11,340,788 B2
(45) Date of Patent: *May 24, 2022

(54) SECURITY CHECKS FOR PROXIED REQUESTS

(71) Applicant: International Business Machines Corporation, Armonk, NY (US)

(72) Inventors: Manish Motwani, Chicago, IL (US); Jason K. Resch, Chicago, IL (US)

(*) Notice: Subject to any disclaimer, the term of this patent is extended or adjusted under 35 U.S.C. 154(b) by 89 days.

This patent is subject to a terminal disclaimer.

(21) Appl. No.: 16/245,988

(22) Filed: Jan. 11, 2019

(65) Prior Publication Data

US 2019/0146676 A1    May 16, 2019

Related U.S. Application Data

(63) Continuation of application No. 15/721,402, filed on Sep. 29, 2017, now Pat. No. 10,203,877, which is a
(Continued)

(51) Int. Cl.
*G06F 3/06* (2006.01)
*H04L 67/06* (2022.01)
(Continued)

(52) U.S. Cl.
CPC .......... *G06F 3/0607* (2013.01); *G06F 3/064* (2013.01); *G06F 3/067* (2013.01); *G06F 3/0619* (2013.01);
(Continued)

(58) Field of Classification Search
CPC .. G06F 3/0607; G06F 3/0637; G06F 11/1076;
G06F 21/10; G06F 21/80; G06F 3/0634;
G06F 3/0647; G06F 3/0659; G06F 3/067;
G06F 3/0619; G06F 3/064; G06F
2221/2129; G06F 2221/2151; H04L
9/085;
(Continued)

(56) References Cited

U.S. PATENT DOCUMENTS 4,092,732 A    5/1978 Ouchi
5,060,266 A    10/1991 Dent
(Continued)

OTHER PUBLICATIONS

Chung; An Automatic Data Segmentation Method for 3D Measured Data Points; National Taiwan University; pp. 1-8; 1998.
(Continued)

*Primary Examiner* — Chris Parry
*Assistant Examiner* — Weiwei Y Stiltner
(74) *Attorney, Agent, or Firm* — Garlick & Markison; Timothy W. Markison; Timothy D. Taylor

(57) ABSTRACT

A method for execution by a storage unit of a dispersed storage network includes receiving a proxied data access request regarding an encoded data slice from another storage unit of the DSN, where the encoded data slice is stored in the storage unit according to a distributed agreement protocol. The method continues with determining whether the other storage unit is an authentic storage unit of the DSN. When the other storage unit is the authentic storage unit, the method continues with processing the proxied data access request to produce a data access response. The method continues with sending the data access response to the other storage unit.

18 Claims, 9 Drawing Sheets

Related U.S. Application Data continuation of application No. 15/259,764, filed on Sep. 8, 2016, now Pat. No. 9,798,467, which is a continuation-in-part of application No. 15/056,517, filed on Feb. 29, 2016, now Pat. No. 9,727,266, which is a continuation-in-part of application No. 12/903,212, filed on Oct. 13, 2010, now Pat. No. 9,462,316.

(60) Provisional application No. 61/290,632, filed on Dec. 29, 2009, provisional application No. 62/154,867, filed on Apr. 30, 2015.

(51) Int. Cl.
```
H04L 67/1097    (2022.01)
G06F 11/10      (2006.01)
G06F 21/10      (2013.01)
G06F 21/80      (2013.01)
H04L 29/06      (2006.01)
H04N 21/218     (2011.01)
H04N 21/231     (2011.01)
H04N 21/232     (2011.01)
H04N 21/274     (2011.01)
H04L 9/08       (2006.01)
```

(52) U.S. Cl.
CPC .......... *G06F 3/0634* (2013.01); *G06F 3/0637* (2013.01); *G06F 3/0647* (2013.01); *G06F 3/0659* (2013.01); *G06F 11/1076* (2013.01); *G06F 21/10* (2013.01); *G06F 21/80* (2013.01); *H04L 9/085* (2013.01); *H04L 9/0894* (2013.01); *H04L 63/101* (2013.01); *H04L 67/06* (2013.01); *H04L 67/1097* (2013.01); *H04N 21/2181* (2013.01); *H04N 21/232* (2013.01); *H04N 21/23116* (2013.01); *H04N 21/274* (2013.01); *G06F 2221/2129* (2013.01); *G06F 2221/2151* (2013.01); *H04L 63/102* (2013.01); *H04L 2209/34* (2013.01)

(58) Field of Classification Search
CPC ... H04L 9/0894; H04L 67/06; H04L 67/1097; H04L 63/101; H04L 2209/34; H04L 63/102; H04N 21/2181; H04N 21/23116; H04N 21/232; H04N 21/274
USPC .......................................................... 709/213
See application file for complete search history.

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,506 A * | 11/1999 | Carter ............ G06F 9/5016 709/213 |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,433,978 B2 | 4/2013 | Grube et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0154408 A1 | 6/2008 | Morohashi |
| 2008/0183975 A1 | 7/2008 | Foster et al. |
| 2009/0083809 A1 | 3/2009 | Hayashi et al. |
| 2009/0094251 A1 | 4/2009 | Gladwin et al. |
| 2009/0094318 A1 | 4/2009 | Gladwin et al. |
| 2009/0157740 A1 | 6/2009 | Barley et al. |
| 2010/0023524 A1 | 1/2010 | Gladwin et al. |
| 2010/0094956 A1 * | 4/2010 | Zuckerman ......... H04L 67/1097 709/219 |
| 2010/0161751 A1 * | 6/2010 | Stewart ............... G06F 3/0683 709/213 |
| 2010/0161843 A1 | 6/2010 | Spry |
| 2010/0235528 A1 | 9/2010 | Bocharov et al. |
| 2011/0040981 A1 | 2/2011 | Lindahl et al. |
| 2011/0125999 A1 | 5/2011 | Cilfone et al. |
| 2012/0233117 A1 * | 9/2012 | Holt .................... G06F 16/1748 707/620 |
| 2014/0331100 A1 | 11/2014 | Dhuse et al. |
| 2016/0179618 A1 | 6/2016 | Resch et al. |
| 2017/0004043 A1 | 1/2017 | Baptist et al. |
| 2017/0006103 A1 | 1/2017 | Motwani et al. |
| 2017/0034184 A1 | 2/2017 | Kazi et al. |

(56) References Cited

U.S. PATENT DOCUMENTS

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

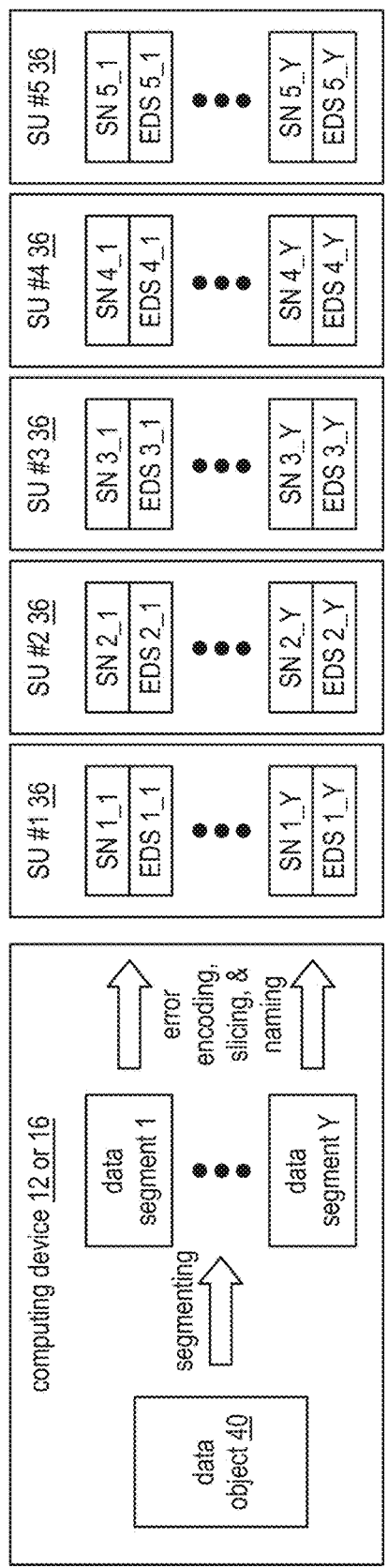
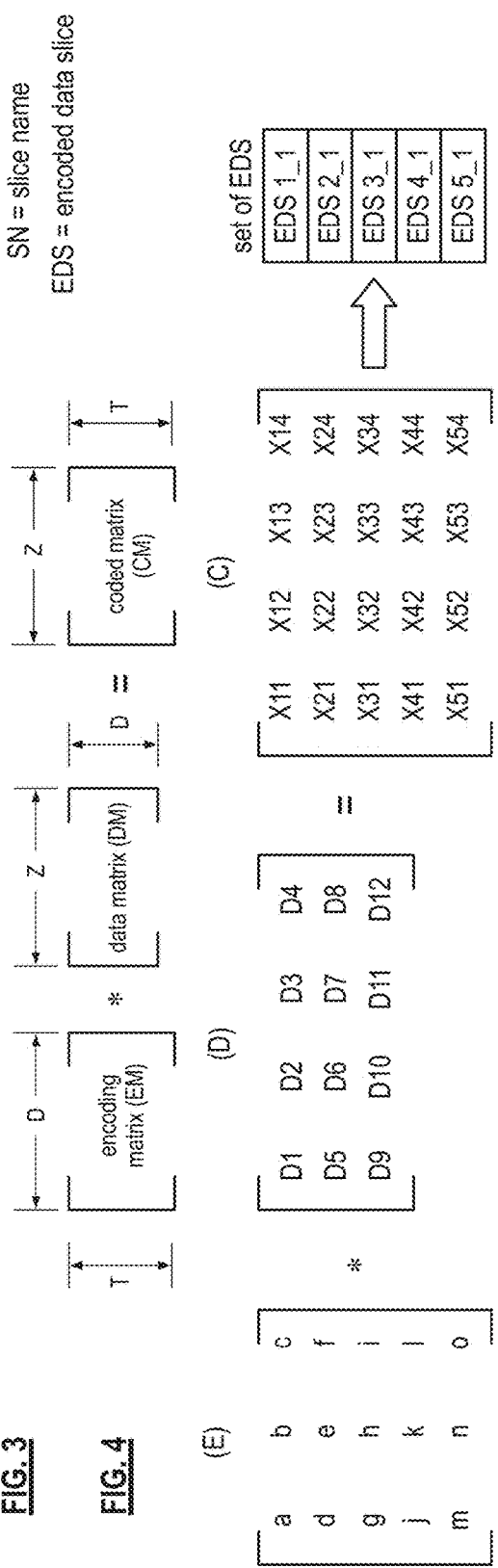
FIG. 3
FIG. 4
FIG. 5
FIG. 6

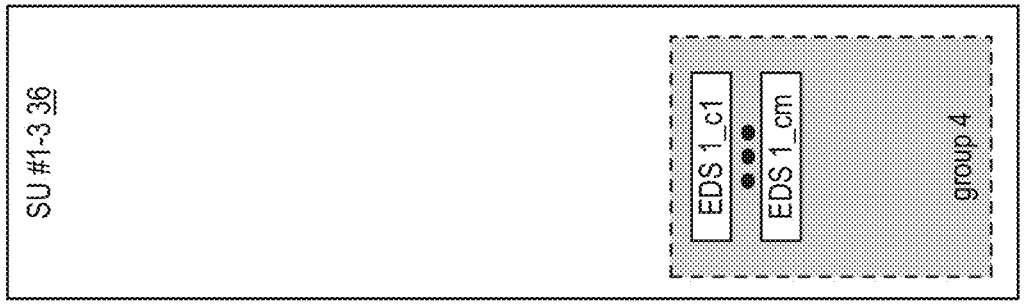
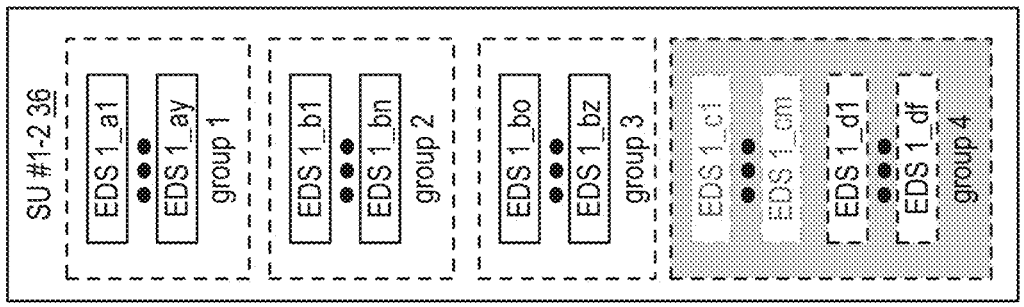
FIG. 12

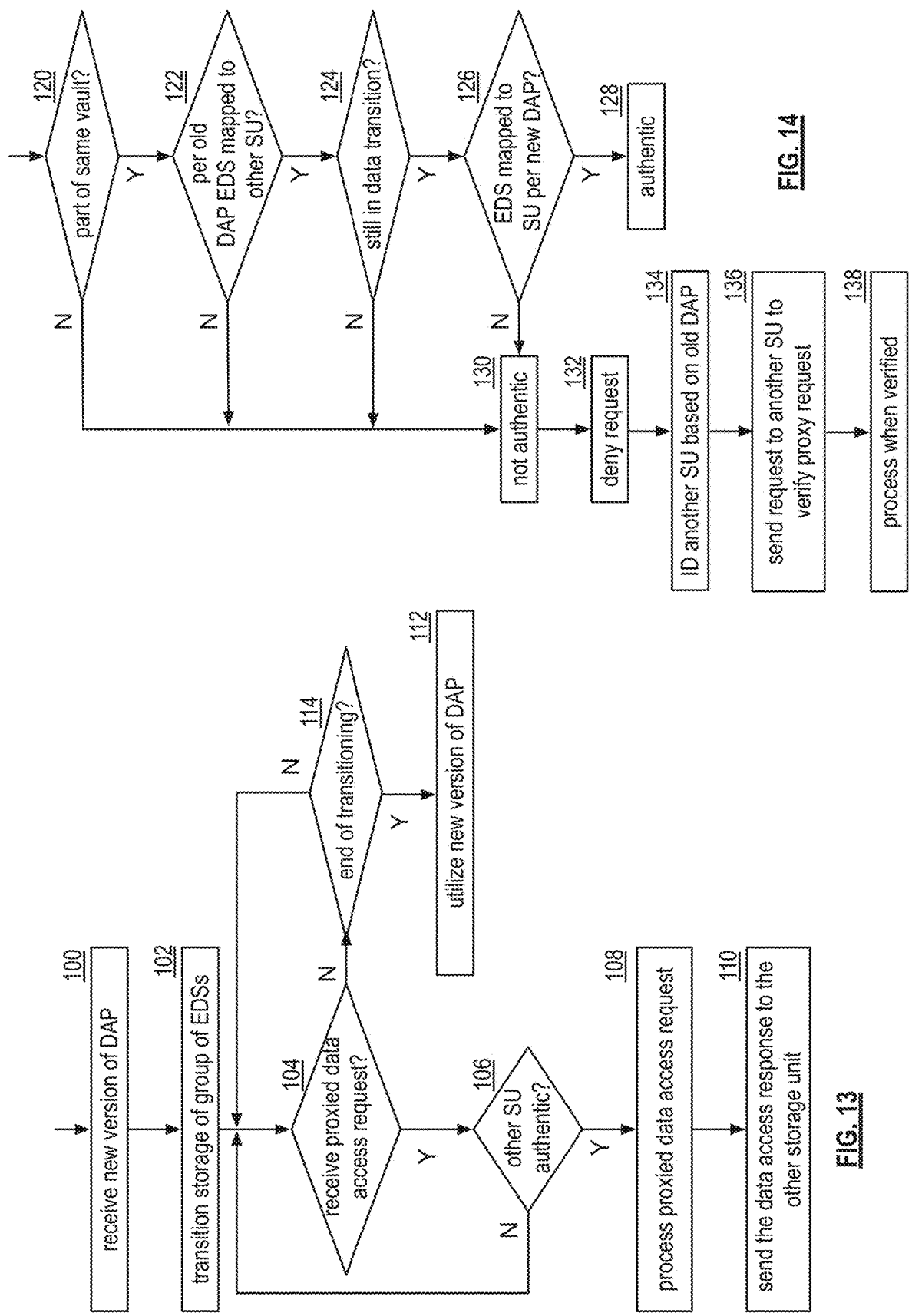

SECURITY CHECKS FOR PROXIED REQUESTS

CROSS REFERENCE TO RELATED PATENTS

The present U.S. Utility patent application claims priority pursuant to 35 U.S.C. § 120 as a continuation of U.S. Utility application Ser. No. 15/721,402, entitled "SECURITY CHECKS FOR PROXIED REQUESTS", filed Sep. 29, 2017, which is a continuation of U.S. Utility application Ser. No. 15/259,764, entitled "SECURITY CHECKS FOR PROXIED REQUESTS", filed Sep. 8, 2016, issued as U.S. Pat. No. 9,798,467 on Oct. 24, 2017, which is a continuation-in-part of U.S. Utility application Ser. No. 15/056,517, entitled "SELECTING STORAGE UNITS IN A DISPERSED STORAGE NETWORK", filed Feb. 29, 2016, issued as U.S. Pat. No. 9,727,266 on Aug. 8, 2017, which a continuation-in-part of U.S. Utility application Ser. No. 12/903,212, entitled "DIGITAL CONTENT RETRIEVAL UTILIZING DISPERSED STORAGE", filed Oct. 13, 2010, issued as U.S. Pat. No. 9,462,316 on Oct. 4, 2016, which claims priority pursuant to 35 U.S.C. § 119(e) to U.S. Provisional Application No. 61/290,632, entitled "DIGITAL CONTENT DISTRIBUTED STORAGE", filed Dec. 29, 2009, expired, all of which are hereby incorporated herein by reference in their entirety and made part of the present U.S. Utility patent application for all purposes.

U.S. Utility patent application Ser. No. 15/056,517 also claims priority pursuant to 35 U.S.C. § 119(e) to U.S. Provisional Application No. 62/154,867, entitled "AUTHORIZING A SLICE ACCESS REQUEST IN A DISPERSED STORAGE NETWORK", filed Apr. 30, 2015, expired, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a dispersed storage system, from time to time, data is transferred from one storage unit to another. When there is a significant amount of data to be transferred, it takes time to accomplish the data transfer. During such data transfers, data access requests for the data being transferred are likely to be received.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12 is a schematic block diagram of an example of transferring a group of encoded data slices between storage units in accordance with the present invention;

FIG. 13 is a logic diagram of an example of a method of determining whether to process a proxied data access request during a transition in accordance with the present invention; and FIG. 14 is a logic diagram of an example of a method of determining whether another storage unit is an authentic storage unit in accordance with the present invention.

DETAILED DESCRIPTION OF THE INVENTION

Figure 1:
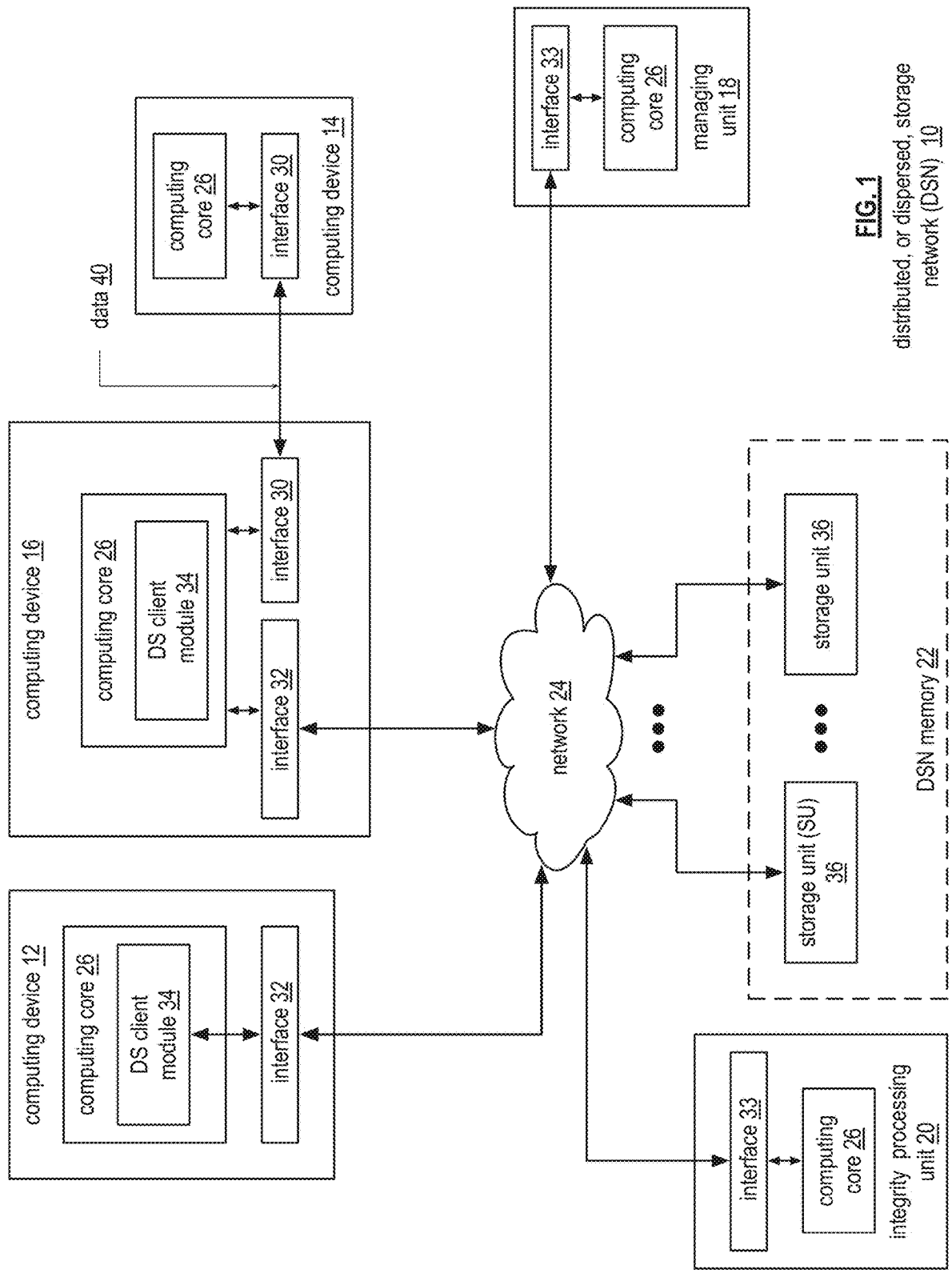
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
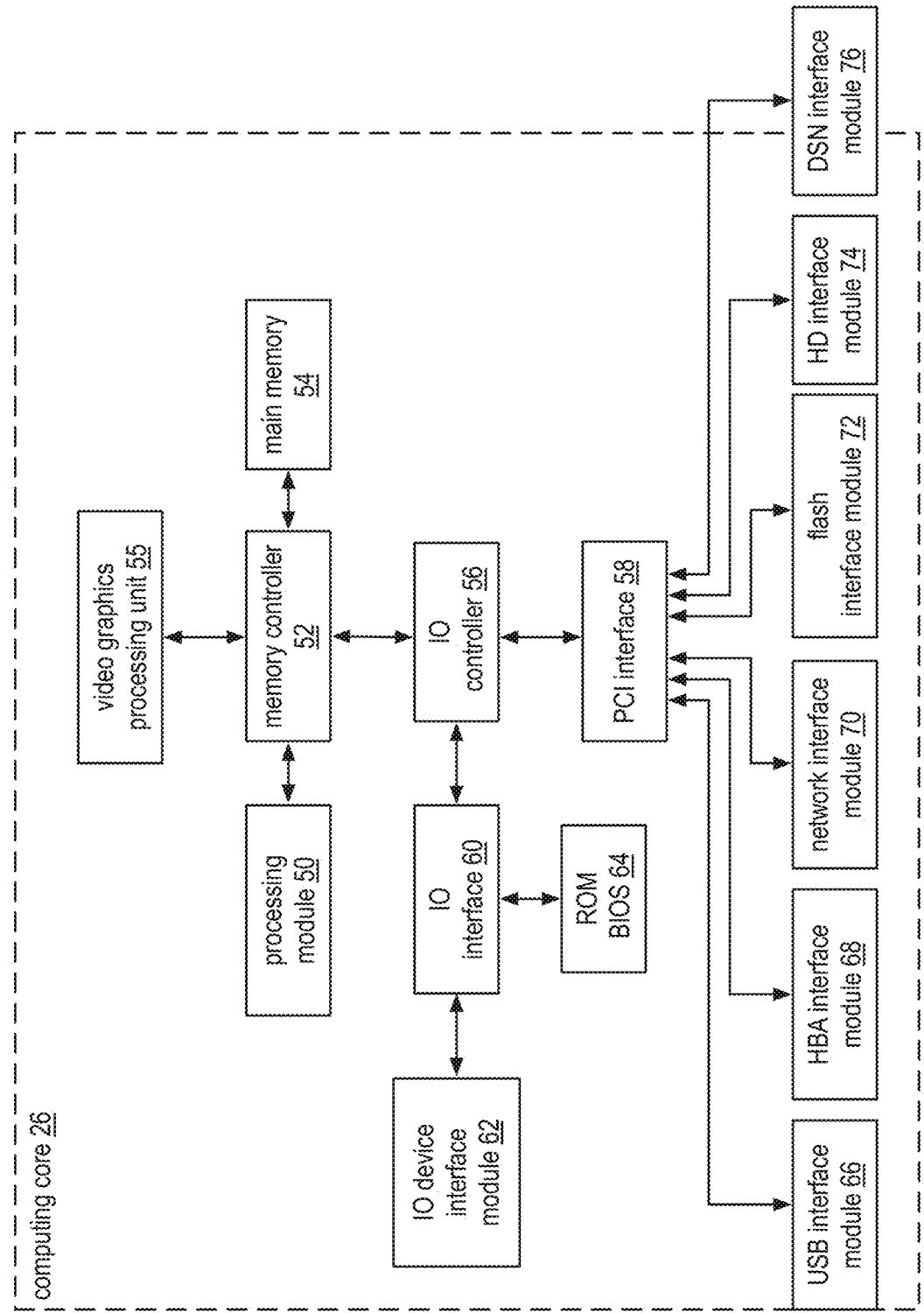
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
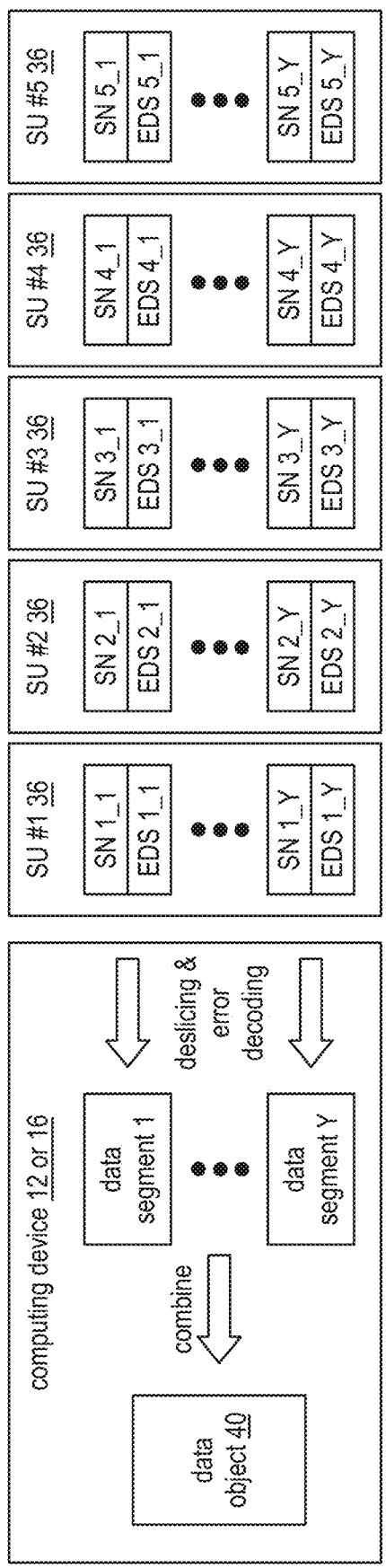
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
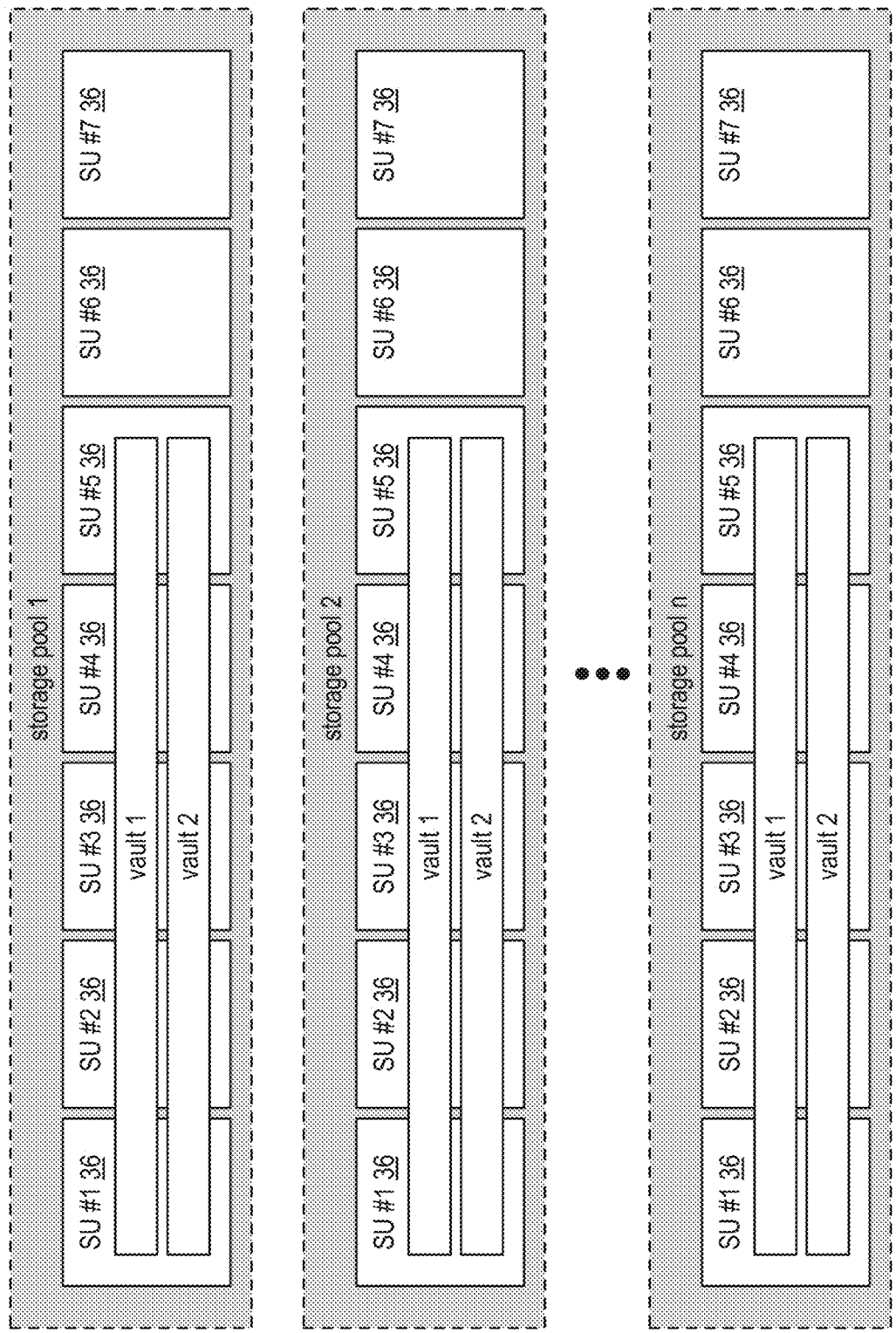
FIG. 9 is a schematic block diagram of an example of storage vaults spanning multiple storage pools in accordance with the present invention.

FIG. 9 is a schematic block diagram of an example of storage vaults spanning multiple storage pools. In this example, the DSN memory 22 includes a plurality of storage units 36 arranged into a plurality of storage pools (e.g., 1-n). In this example, each storage pool includes seven storage units for ease of illustration. A storage pool, however, can have many more storage units than seven and, from storage pool to storage pool, may have different numbers of storage units.

The storage pools 1-n support two vaults (vault 1 and vault 2) using only five of seven of the storage units. The number of storage units within a vault correspond to the pillar width number, which is five in this example. Note that a storage pool may have rows of storage units, where SU #1 represents a plurality of storage units, each corresponding to a first pillar number; SU #2 represents a second plurality of storage units, each corresponding to a second pillar number; and so on. Note that other vaults may use more or less than a width of five storage units.

Figure 10:
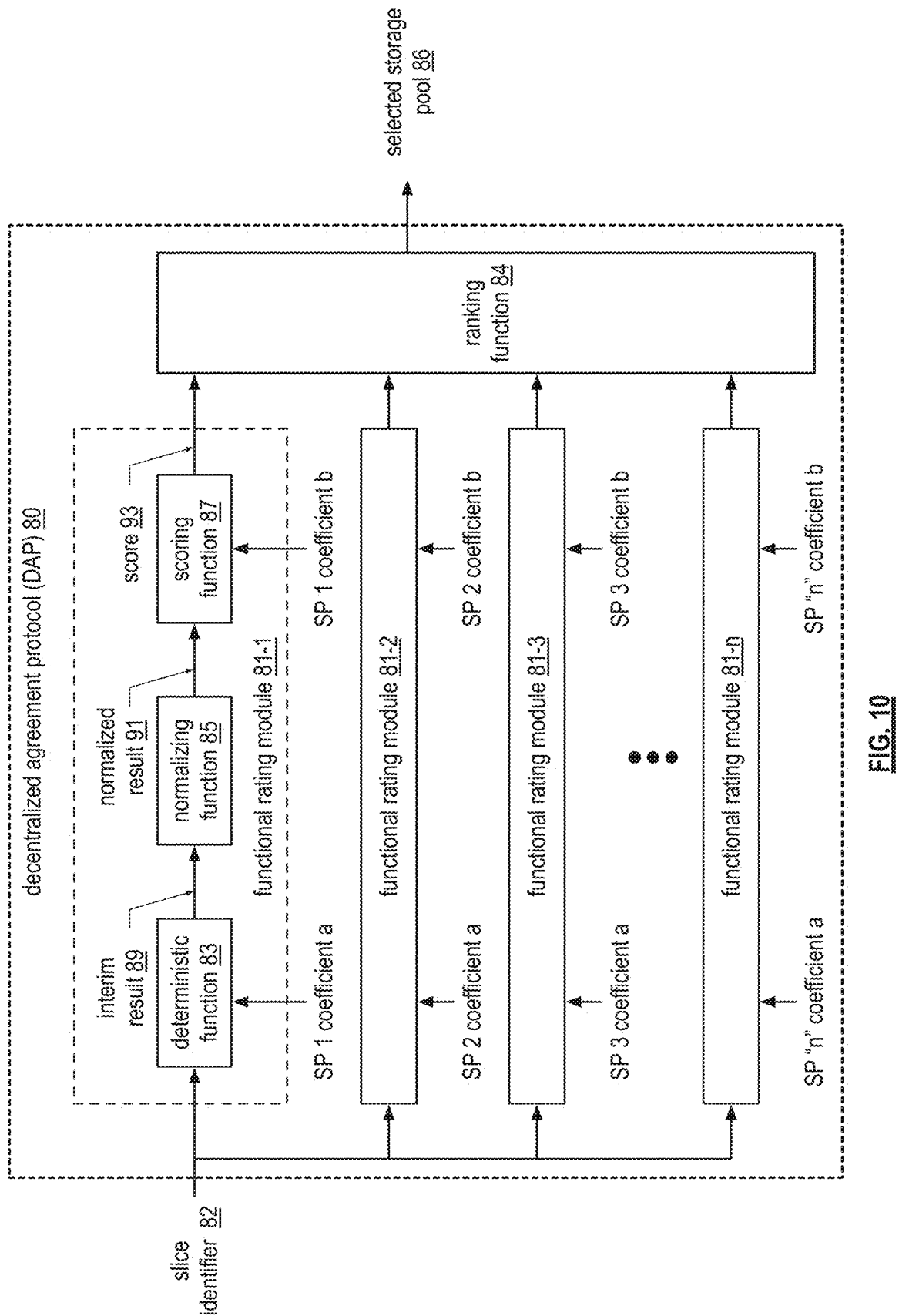
FIG. 10 is a schematic block diagram of an embodiment of a decentralized, or distributed, agreement protocol (DAP) in accordance with the present invention.

FIG. 10 is a schematic block diagram of an embodiment of a decentralized, or distributed, agreement protocol (DAP) 80 that may be implemented by a computing device, a storage unit, and/or any other device or unit of the DSN to determine where to store encoded data slices or where to find stored encoded data slices. The DAP 80 includes a plurality of functional rating modules 81. Each of the functional rating modules 81 includes a deterministic function 83, a normalizing function 85, and a scoring function 87.

Each functional rating module 81 receives, as inputs, a slice identifier 82 and storage pool (SP) coefficients (e.g., a first functional rating module 81-1 receives SP 1 coefficients "a" and b). Based on the inputs, where the SP coefficients are different for each functional rating module 81, each functional rating module 81 generates a unique score 93 (e.g., an alpha-numerical value, a numerical value, etc.). The ranking function 84 receives the unique scores 93 and orders them based on an ordering function (e.g., highest to lowest, lowest to highest, alphabetical, etc.) and then selects one as a selected storage pool 86. Note that a storage pool includes one or more sets of storage units. Further note that the slice identifier 82 corresponds to a slice name or common attributes of set of slices names. For example, for a set of encoded data slices, the slice identifier 82 specifies a data segment number, a vault ID, and a data object ID, but leaves open ended, the pillar number. As another example, the slice identifier 82 specifies a range of slice names (e.g., 0000 0000 to FFFF FFFF).

As a specific example, the first functional rating module 81-1 receives the slice identifier 82 and SP coefficients for storage pool 1 of the DSN. The SP coefficients includes a first coefficient (e.g., "a") and a second coefficient (e.g., "b"). For example, the first coefficient is a unique identifier for the corresponding storage pool (e.g., SP #1's ID for SP 1 coefficient "a") and the second coefficient is a weighting factor for the storage pool. The weighting factors are derived to ensure, over time, data is stored in the storage pools in a fair and distributed manner based on the capabilities of the storage units within the storage pools.

For example, the weighting factor includes an arbitrary bias which adjusts a proportion of selections to an associated location such that a probability that a source name will be mapped to that location is equal to the location weight divided by a sum of all location weights for all locations of comparison (e.g., locations correspond to storage units). As a specific example, each storage pool is associated with a location weight factor based on storage capacity such that, storage pools with more storage capacity have a higher location weighting factor than storage pools with less storage capacity.

The deterministic function 83, which may be a hashing function, a hash-based message authentication code function, a mask generating function, a cyclic redundancy code function, hashing module of a number of locations, consistent hashing, rendezvous hashing, and/or a sponge function, performs a deterministic function on a combination and/or concatenation (e.g., add, append, interleave) of the slice identifier 82 and the first SP coefficient (e.g., SU 1 coefficient "a") to produce an interim result 89.

The normalizing function 85 normalizes the interim result 89 to produce a normalized result 91. For instance, the normalizing function 85 divides the interim result 89 by a number of possible output permutations of the deterministic function 83 to produce the normalized result. For example, if the interim result is 4,325 (decimal) and the number of possible output permutations is 10,000, then the normalized result is 0.4325.

The scoring function 87 performs a mathematical function on the normalized result 91 to produce the score 93. The mathematical function may be division, multiplication, addition, subtraction, a combination thereof, and/or any mathematical operation. For example, the scoring function divides the second SP coefficient (e.g., SP 1 coefficient "b") by the negative log of the normalized result (e.g., $e^y=x$ and/or $\ln(x)=y$). For example, if the second SP coefficient is 17.5 and the negative log of the normalized result is 1.5411 (e.g., e(0.4235)), the score is 11.3555.

The ranking function 84 receives the scores 93 from each of the function rating modules 81 and orders them to produce a ranking of the storage pools. For example, if the ordering is highest to lowest and there are five storage units in the DSN, the ranking function evaluates the scores for five storage units to place them in a ranked order. From the ranking, the ranking module 84 selects one the storage pools 86, which is the target for a set of encoded data slices.

The DAP 80 may further be used to identify a set of storage units, an individual storage unit, and/or a memory device within the storage unit. To achieve different output results, the coefficients are changed according to the desired location information. The DAP 80 may also output the ranked ordering of the scores.

Figure 11:
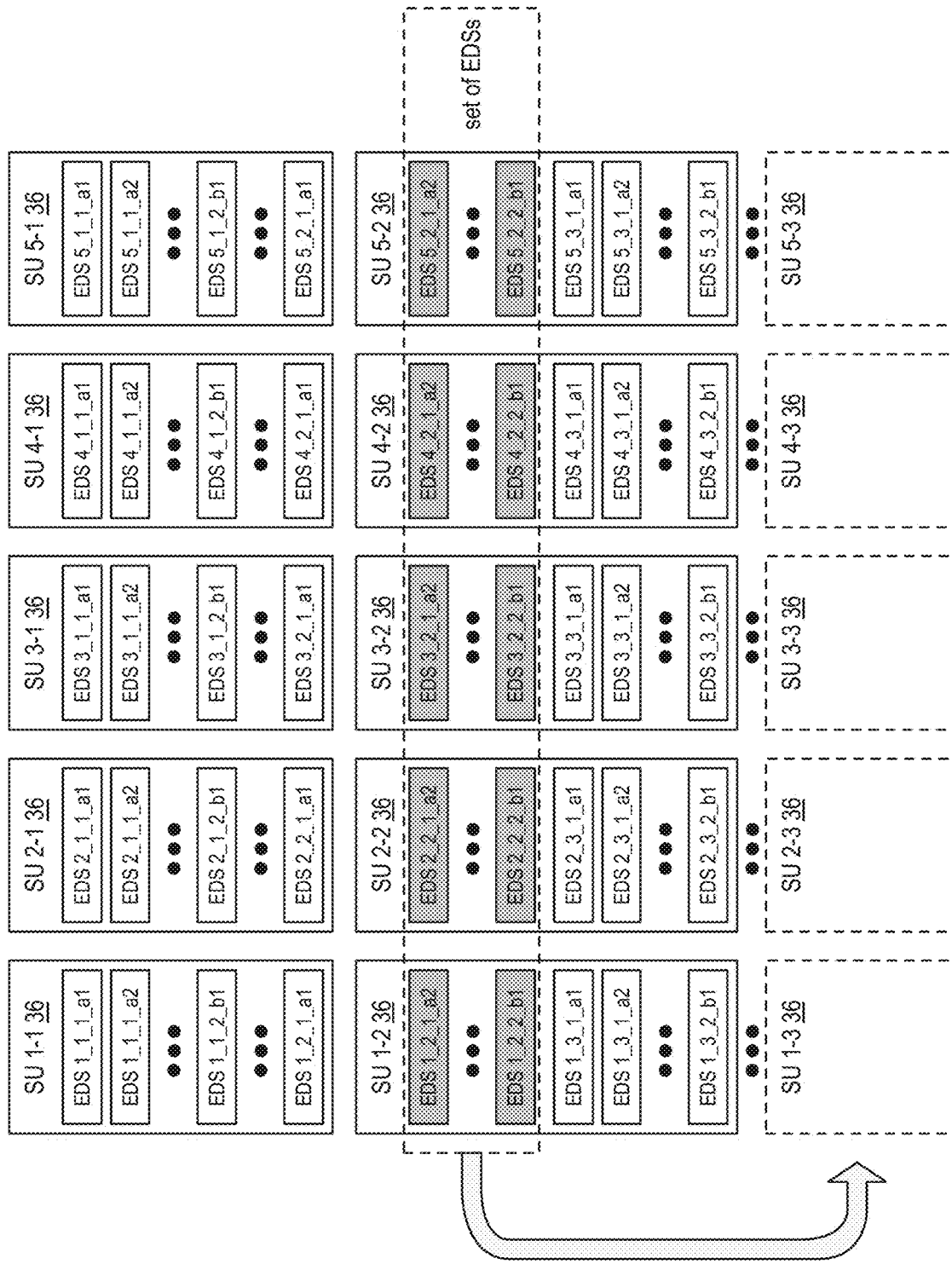
FIG. 11 is a schematic block diagram of storage units transferring a set of encoded data slices due to a change in the distributed agreement protocol in accordance with the present invention.

FIG. 11 is a schematic block diagram of storage units transferring a set of encoded data slices due to a change in the distributed agreement protocol. As shown, the storage units 36 store a plurality of encoded data slices. Each storage unit 36 may store encoded data slices that correspond to one or more different data objects. When a change occurs in the system (e.g., a storage unit is added, a storage unit is deleted, memory in a storage unit is added, etc.) the DAP may be updated causing encoded data slices stored at one storage unit to be mapped to another storage unit. For example, the storage units 1-3 through 5-3 are added to a vault, which triggers a change in the SP coefficients of the disturbed agreement protocol, storage unit 1-2 determines that encoded data slices EDS 1_2_1_a2 through EDS 1_2_2_b1 should be transferred to storage unit 1-3. As another example, the storage units receive a message from a DS managing unit that a new distributed agreement protocol (e.g., new SP coefficients) will be used. The storage units then determine, based on the previous and new distributed agreement protocol, that a set of encoded data slices are to be transferred from storage units 1-2 through 5-2 to storage units 1-3 through 5-3. For example, the storage units determine that based on the new distributed agreement protocol, encoded data slices 1_2_1_a2 through 1_2_2_b1 are to be transferred from SU 1-2 to SU 1-3, encoded data slices 2_2_1_a2 through 2_2_2_b1 are to be transferred from SU 1-2 to SU 1-3, etc.

FIG. 12 is a schematic block diagram of an example of transferring a group of encoded data slices between storage units SU 1-2 36 and SU 1-3 36 as a result of a change to the distributed agreement protocol. Prior to the change, SU 1-2 is determined to store four groups of encoded data slices (EDS 1_a1 through EDS 1_ay, EDS 1_b1 through EDS 1_bn, EDS 1_bo through EDS 1_bz, and EDS 1_c1 through EDS 1_df). Note that a group may include one or more encoded data slices that are identifiable based on at least a portion of the slice name (e.g., based on the object ID, the pillar number, the data segment number, revision information, a vault ID and/or identifying information).

In this example, the change to the distributed agreement protocol causes group 4 of encoded data slices to be transferred from SU 1-2 to SU 1-3. This example further illustrates that the transfer of encoded data slices from the SU 1-2 to SU 1-3 is in progress. For example, encoded data slices 1_c1 through 1_cm have been successfully transferred, while encoded data slices 1_d1 through 1_df have not yet been transferred. During the pendency of the encoded data slice transfer, one or more data access requests may be received for encoded data slices within group 4. For example, SU #1-3 36 may receive a proxied data access request from SU #1-2 regarding EDS 1_c1. SU #1-3 36 may determine to first authenticate the proxied data access request from SU #1-2 before determining whether to send a data access response.

FIG. 13 is a logic diagram of an example of a method of determining whether to process a proxied data access request during a transition. The method begins at step 100, where the storage unit receives a new version of a distributed agreement protocol. For example, the storage unit receives the new version of the distributed agreement protocol and maintains the previous version of a distributed agreement protocol for processing data access requests regarding the one or more groups of encoded data slices during a transition of storage. The method continues at step 102, where storage of one or more groups of encoded data slices is transitioned from storage based on a previous version of a distributed agreement protocol to storage based on a new version of the distributed agreement protocol. For example, a storage unit receives a new distributed agreement protocol and determines based on the new distributed agreement protocol that encoded data slices stored in the storage unit (e.g., SU 1-2) based on an old (e.g., previous) distributed agreement protocol are to be transferred to another storage unit (e.g., SU 1-3).

While transitioning storage of the one or more groups of encoded data slices, the method continues at step 104, where the storage unit determines if a proxied data access request regarding an encoded data slice from another storage unit of the DSN has been received. When the storage unit determines the proxied data access request has not been received, the method continues at step 114, where the storage unit determines if the transitioning from the old distributed agreement protocol to the new distributed agreement protocol has ended (e.g., all encoded data slices have been transferred according to the new distributed agreement protocol).

When the transitioning has ended, the method continues to step 112, where the storage unit utilizes the new distributed agreement protocol. For example, when the transition of storage is complete, the storage unit utilizes the new version of a distributed agreement protocol for processing data access requests regarding the one or more groups of encoded data slices. When the transitioning has not ended, the method loops back to step 104.

When the storage unit determines the proxied data access request has been received, the method continues at step 106, where the storage unit determines whether the other storage unit is an authentic storage unit of the DSN based on at least one of the encoded data slice, the previous version of the distributed agreement protocol, and the new version of the distributed agreement protocol. Note the authentication process will be discussed in detail in the discussion of FIG. 14. When the other storage unit is the authentic storage unit, the method continues to step 108, where the storage unit processes the proxied data access request to produce a data access response. The method continues at step 110, where the storage unit sends the data access response to the other storage unit. When the other storage unit is not the authentic storage unit, the method loops back to step 104.

FIG. 14 is a logic diagram of another example of the method of determining whether another storage unit is an authentic storage unit. The method begins with step 120, where the storage unit determines if the other storage unit is part of the same vault as the storage unit. The determining may include one or more of identifying the storage pool, identifying the other storage pool, interpreting system registry information, and interpreting a query response. For example, the storage unit of a first storage pool interprets the system registry information to determine that the other storage unit is associated with the same vault.

When the storage unit is not part of the same vault, the method continues to step 130. When the storage unit is part of the same vault, the method continues to step 122, where the storage unit determines whether the encoded data slice is mapped to the other storage unit based on the previous (e.g., old) version of the distributed agreement protocol. The determining includes one or more of interpreting a system registry information and interpreting results of utilizing a distributed agreement protocol function on a slice name utilizing location weights (e.g., SP coefficients) of the other storage pool.

When the storage unit determines the encoded data slice is not mapped to the other storage, the method continues to step 130.

When the storage unit determines the encoded data slice is mapped to the other storage, the method continues to step 124, where the storage unit determines if an ongoing migration task from the other storage unit to the storage unit is active. The determining includes one or more of interpreting a migration status indicator, interpreting system registry information, and interpreting a query response. For example, the storage unit determines if there is an ongoing migration task by querying a DSN managing unit. As another example, the storage unit determines if there is an ongoing migration task by determining the storage unit is concurrently using both the old and new distributed agreement protocol. As yet another example, the storage unit determines if there is an ongoing migration task by receiving a message indicating to use the new distributed agreement protocol for data access requests.

When the storage unit determines the ongoing migration task from the other storage unit to the storage unit is not active, the method continues to step 130. When the storage unit determines the ongoing migration task from the other storage unit to the storage unit is active, the method continues to step 126, where the storage unit determines if the encoded data slice is mapped to the storage unit based on the new version of the distributed agreement protocol. The determining includes one or more of interpreting system registry information and interpreting results of utilizing a distributed agreement protocol function on a slice name utilizing SP coefficients of the storage pool. When the storage unit determines the encoded data slice is not mapped to the storage unit based on the new version of the distributed agreement protocol, the method continues to step 130. When the storage unit determines the encoded data slice is mapped to the storage unit based on the new version of the distributed agreement protocol, the method continues to step 128, where the storage unit has determined the other storage unit has been authenticated and processes the proxied data access request. Note that not all (e.g., one or more of steps 120, 122, 124, and 126) of the authentication steps necessarily have to be implemented for authentication of the other storage unit. For example, the storage unit uses steps 122 and 126 to authenticate the other storage unit when receiving a proxied data access request, but does not use steps 120 and 124.

The method continues at step 130, where the storage unit determines the other storage unit is not the authentic storage unit. For example, the storage unit determines the other storage unit is not part of the same vault. As another example, the storage unit determines the transition has ended, thus the other storage unit should not be proxying requests (e.g., took a real request and spoofed the system by the other storage unit). The method continues at step 132, where the storage unit denies the proxied data access request. Optionally, the method continues at step 134, where the storage unit identifies a second storage unit based on the encoded data slice and the old distributed agreement protocol. The method continues at step 136, where the storage unit sends a request to the second storage unit to verify the proxied data access request. If the second storage unit verifies the proxied access request, the method continues at step 138, the storage unit processes the request and sends a response to the second storage unit.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a storage unit of a dispersed or distributed storage network (DSN), a proxied data access request regarding an encoded data slice from another storage unit of the DSN, wherein a data segment of data is dispersed storage error encoded into a set of encoded data slices, wherein the set of encoded data slices includes the encoded data slice, wherein the set of encoded data slices are stored in a set of storage units, wherein the set of storage units includes the storage unit, and wherein the other storage unit stores at least one encoded data slice of a second set of encoded data slices;
    determining, by the storage unit, whether the other storage unit is an authentic storage unit of the DSN based on the encoded data slice;
    when the other storage unit is not the authentic storage unit, denying the proxied data access request; and
    when the other storage unit is the authentic storage unit:
        processing, by the storage unit, the proxied data access request to produce a data access response; and
        sending, by the storage unit, the data access response to the other storage unit.

2. The method of claim 1, wherein the determining whether the other storage unit is the authentic storage unit comprises:

determining the other storage unit is part of the same vault as the storage unit.

3. The method of claim 1, wherein the determining whether the other storage unit is the authentic storage unit comprises:
determining the encoded data slice is mapped to the other storage unit based on a previous version of a distributed agreement protocol.

4. The method of claim 1, wherein the determining whether the other storage unit is the authentic storage unit comprises:
determining that an ongoing migration task from the other storage unit to the storage unit is active, wherein the ongoing migration task includes transitioning storage of the encoded data slice from storage based on a previous version of a distributed agreement protocol to storage based on a new version of the distributed agreement protocol.

5. The method of claim 4, wherein determining the ongoing migration task comprises one or more of:
querying a DSN managing unit;
determining the storage unit is concurrently using both the previous and new distributed agreement protocol; and
receiving a message indicating to use the new distributed agreement protocol for data access requests.

6. The method of claim 1, wherein the determining whether the other storage unit is the authentic storage unit comprises:
determining the encoded data slice is mapped to the storage unit based on a new version of a distributed agreement protocol.

7. The method of claim 1, wherein when the other storage unit is not the authentic storage unit further comprises:
identifying a second storage unit based on the encoded data slice and an old distributed agreement protocol;
sending a request to the second storage unit to verify the proxied data access request; and
when verified, processing the request and sending a response to the second storage unit.

8. The method of claim 1 further comprises:
receiving a new version of a distributed agreement protocol for processing data access requests regarding one or more groups of encoded data slices that include the encoded data slice;
determining, based on the new version of the distributed agreement protocol, that the encoded data slice is mapped to an updated storage unit; and
proxying the data access request to the updated storage unit.

9. The method of claim 1, wherein the determining whether the other storage unit is an authentic storage unit is further based on at least one of:
a previous version of a distributed agreement protocol; and
a new version of the distributed agreement protocol.

10. A storage unit of a dispersed or distributed storage network (DSN) comprises:
an interface;
memory; and
a processing module operably coupled to the memory and the interface, wherein the processing module is operable to:
receive, via the interface, a proxied data access request regarding an encoded data slice from another storage unit of the DSN, wherein a data segment of data is dispersed storage error encoded into a set of encoded data slices, wherein the set of encoded data slices includes the encoded data slice, wherein the set of encoded data slices are stored in a set of storage units, wherein the set of storage units includes the storage unit, and wherein the other storage unit stores at least one encoded data slice of a second set of encoded data slices;
determine whether the other storage unit is an authentic storage unit of the DSN based on the encoded data slice;
when the other storage unit is not the authentic storage unit, deny the proxied data access request; and
when the other storage unit is the authentic storage unit, process the proxied data access request to produce a data access response:
send, via the interface, the data access response to the other storage unit.

11. The storage unit of claim 10, wherein the processing module determines whether the other storage unit is the authentic storage unit by:
determining the other storage unit is part of the same vault as the storage unit.

12. The storage unit of claim 10, wherein the processing module determines whether the other storage unit is the authentic storage unit by:
determining the encoded data slice is mapped to the other storage unit based on a previous version of a distributed agreement protocol.

13. The storage unit of claim 10, wherein the processing module determines whether the other storage unit is the authentic storage unit by:
determining that an ongoing migration task from the other storage unit to the storage unit is active, wherein the ongoing migration task includes transitioning storage of the encoded data slice from storage based on a previous version of a distributed agreement protocol to storage based on a new version of the distributed agreement protocol.

14. The storage unit of claim 13, wherein the processing module determines the ongoing migration task by one or more of:
querying a DSN managing unit;
determining the storage unit is concurrently using both a previous and a new distributed agreement protocol; and
receiving, via the interface, a message indicating to use the new distributed agreement protocol for data access requests.

15. The storage unit of claim 10, wherein the processing module determines whether the other storage unit is the authentic storage unit by:
determining the encoded data slice is mapped to the storage unit based on a new version of a distributed agreement protocol.

16. The storage unit of claim 10, wherein when the other storage unit is not the authentic storage unit the processing module further functions to:
identify a second storage unit based on the encoded data slice and an old distributed agreement protocol;
send, via the interface, a request to the second storage unit to verify the proxied data access request;
when verified, process the request and send, via the interface, a response to the second storage unit.

17. The storage unit of claim 10, wherein the processing module further functions to:
receive a new version of a distributed agreement protocol for processing data access requests regarding one or more groups of encoded data slices that include the encoded data slice;

determine, based on the new version of the distributed agreement protocol, that the encoded data slice is mapped to an updated storage unit; and proxy, via the interface, the data access request to the updated storage unit.

18. The storage unit of claim 10, wherein the processing module determines whether the other storage unit is an authentic storage unit further by at least one of:

a previous version of a distributed agreement protocol; and a new version of the distributed agreement protocol.

\* \* \* \* \*